Patented Nov. 30, 1937

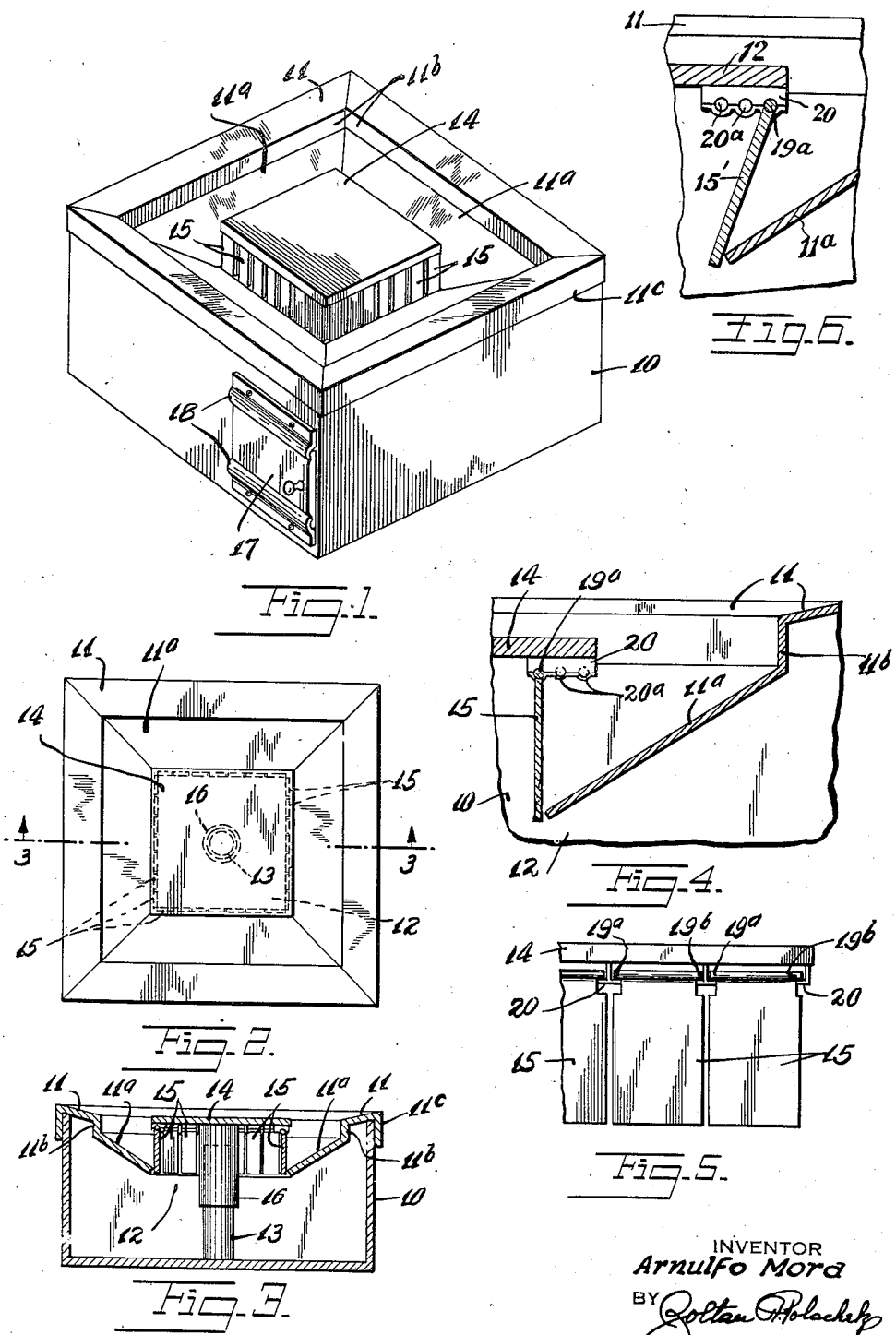

2,100,909

UNITED STATES PATENT OFFICE 2,100,909

AUTOMATIC ROACH TRAP

Arnulfo Mora, El Paso, Tex.

Application September 11, 1936, Serial No. 100,256

7 Claims. (Cl. 43—121)

This invention relates to new and useful improvements in an automatic roach trap.

The invention has for an object the construction of a trap which is characterized by a container having a top wall with an opening and the portions around said opening being smooth and steeply inclined downwards so that roaches walking thereon will slip and fall into the container.

Still further the invention proposes the provision of a platform supported from within the container and extending to the exterior upon which bait for the roaches may be placed.

Another one of the objects of this invention resides in the provision of a door upon the side of the container through which the roaches may be shaken therefrom.

Still furhter it is proposed to provide a plurality of trap doors pivotally mounted at their top ends upon the edges of said platform and extending downwards into said opening and freely resting against the edge portions of said openings so as to automatically open when the roaches slide down the inclined portions.

Still further the invention proposes an arrangement which will permit the trap doors to be shifted into positions so that it will require different forces to open them. Thus, the trap may be adjusted to catch other insects which crawl and walk.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Fig. 1 is a perspective view of an automatic roach trap constructed according to this invention.

Fig. 2 is a plan view of Fig. 1.

Fig. 3 is a sectional view taken on the line 3—3 of Fig. 2.

Fig. 4 is a fragmentary enlarged detailed view of a portion of Fig. 3.

Fig. 5 is a fragmentary enlarged elevational view of a portion of the bait platform showing the trap doors.

Fig. 6 is a view similar to Fig. 4 but showing the device in one of its adjusted positions.

The automatic roach trap, according to this invention comprises a container 10 having a top wall 11 and an opening 12 therein, the portions 11$^a$ around said openings being smooth and steeply inclined downwards, and joined with the top wall 11 by a short vertical intermediate portion 11$^b$. A support 13 is arranged within the container 10. A platform 14 for bait is disposed above the opening 12 and is mounted on the support 13. A plurality of trap doors 15 are pivotally mounted at their top ends on the edges of said platform and extend downwards to the opening and freely rest against the edges of the said portions 11$^a$.

The outer faces of the container 10 are preferably finished with rough material upon which the roach may readily climb. The space between the edges of the platform 14 and the horizontal portion of the top wall 11 is sufficiently great to make it impossible for the roach to jump across from one portion to the other. It is therefore necessary that they attempt to reach the platform by walking down the vertical and inclined portions 11$^b$ and 11$^a$.

A tubular member 16 is attached upon the underside of the platform 14 and is adapted to engage upon the support 13. Thus the platform is removably supported in position. The top wall 11 is in the form of a cover for the container 10, so that it may be removed when desired. It is provided with an edge flange 11$^c$ engaging the top edge portions of the container 10.

One of the side walls of the container 10 is formed with an opening which is normally closed with a door 17 slidably supported on tracks 18 mounted on portions of the side wall adjacent the opening. When desired, the door 17 may be moved to an open position and the trap emptied.

Each of the trap doors 15 has trunnions 19$^a$, 19$^b$ at its top, the elements of which engage tracks 20 mounted upon the underside of the platform 14. These tracks 20 are arranged at right angles to the edges of the platform. They are also formed with several depressed socket portions 20$^a$ which form bearings for the trunnions. It is thus possible to support the trap doors 15 in various positions. For example, in Fig. 4 the trap door is shown supported in one position by the full lines and by the dot and dash lines 15' in a fixed position, while the dot and dash lines 15'' illustrate a third position.

It should be noted that the edges of the platform 14 overhang the edges of the inclined portion 11$^a$. Thus the trap doors 15 may be supported in various angular positions and so an adjustment is possible to fit the trap for different sized insects and bugs. When the trap doors are in the position shown at 15' in Fig. 6, it will require more force to open them. Therefore if larger insects are caught which may have more strength than smaller ones, it is necessary that the trap doors be set so that it requires greater strength to open them. Also, the larger insects have more weight and therefore when they fall into the trap they automatically open the trap doors as they pass.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:—

1. An automatic roach trap comprising a container having a top wall with an opening and the portion around said opening being smooth and steeply inclined downwards, a support within said container, a platform for bait above said opening and mounted on said support, and a plurality of trap doors pivotally mounted at their top ends upon the edge of said platform and extending downwards into said opening and freely resting against the edge of said portion.

2. An automatic roach trap comprising a container having a top wall with an opening and the portion around said opening being smooth and steeply inclined downwards, a support within said container, a platform for bait above said opening and mounted on said support, and a plurality of trap doors pivotally mounted at their top ends upon the edge of said platform and extending downwards into said opening and freely resting against the edge of said portion, said top wall comprising a cover portion which is removably mounted on the top edge of said container portion.

3. An automatic roach trap comprising a container having a top wall with an opening and the portion around said opening being smooth and steeply inclined downwards, a support within said container, a platform for bait above said opening and mounted on said support, a plurality of trap doors pivotally mounted at their top ends upon the edge of said platform and extending downwards into said opening and freely resting against the edge of said portion, and a tubular member mounted upon the bottom of the platform adapted to engage said support.

4. An automatic roach trap comprising a container having a top wall with an opening and the portion around said opening being smooth and steeply inclined downwards, a support within said container, a platform for bait above said opening and mounted on said support, a plurality of trap doors pivotally mounted at their top ends upon the edges of said platform and extending downwards into said opening and freely resting against the edge of said portion, a tubular member mounted upon the bottom of the platform adapted to engage said support, the edge of said platform overhanging the edge of said steeply inclined portion, and means adapted to pivotally support the tops of said trap doors in varying positions to overhang the edge of said steeply inclined portion for varying the force necessary to open the trap doors.

5. An automatic roach trap comprising a container having a top wall with an opening and the portion around said opening being smooth and steeply inclined downwards, a support within said container, a platform for bait above said opening and mounted on said support, a plurality of trap doors pivotally mounted at their top ends upon the edges of said platform and extending downwards into said opening and freely resting against the edge of said portion, a tubular member mounted upon the bottom of the platform adapted to engage said support, the edge of said platform overhanging the edge of said steeply inclined portion, and means adapted to pivotally support the tops of said trap doors in varying positions to overhang the edge of said steeply inclined portion for varying the force necessary to open the trap doors, tracks mounted on the bottom side of said platform, each trap door being provided with trunnions at the top thereof which engage said tracks to accomplish the pivotal supporting.

6. An automatic roach trap comprising a container having a top wall with an opening and the portion around said opening being smooth and steeply inclined downwards, a support within said container, a platform for bait above said opening and mounted on said support, a plurality of trap doors pivotally mounted at their top ends upon the edges of said platform and extending downwards into said opening and freely resting against the edge of said portion, a tubular member being mounted upon the bottom of the platform adapted to engage said support, the edge of said platform overhanging the edge of said steeply inclined portion, and means adapted to pivotally support the tops of said trap doors in varying positions to overhang the edge of said steeply inclined portion for varying the force necessary to open the trap doors, tracks mounted on the bottom side of said platform, each trap door being provided with trunnions at the top thereof which engage said tracks to accomplish the pivotal supporting, and said tracks being provided with spaced recessed portions for receiving and holding the trunnions in different positions.

7. An automatic roach trap comprising a container having a top wall with an opening and the portion around said opening being smooth and steeply inclined downwards, a support within said container, a platform for bait above said opening and mounted on said support, and a plurality of trap doors pivotally mounted at their top ends upon the edge of said platform and extending downwards into said opening and freely resting against the edge of said portion, said top wall and the inclined portion being joined by a short vertical portion.

ARNULFO MORA.